United States Patent [19]

Hamilton

[11] 4,423,484
[45] Dec. 27, 1983

[54] IRRIGATION CONTROL SYSTEM

[76] Inventor: William H. Hamilton, 131 SW. 156th St., Seattle, Wash. 98166

[21] Appl. No.: 248,704

[22] Filed: Mar. 30, 1981

[51] Int. Cl.$^3$ .................. G06F 15/46; G05D 7/06
[52] U.S. Cl. ........................ 364/420; 137/624.2; 239/69; 364/145; 364/569; 364/707
[58] Field of Search .............. 364/145, 200 MS File, 364/420, 510, 569, 900 MS File, 707; 239/69, 70; 137/624.11, 624.15, 624.2

[56] References Cited

U.S. PATENT DOCUMENTS

| | | | |
|---|---|---|---|
| D. 247,717 | 4/1978 | Sturman et al. | D23/38 |
| 3,683,239 | 8/1972 | Sturman | 317/150 |
| 3,743,898 | 7/1973 | Sturman | 317/154 |
| 3,821,967 | 7/1974 | Sturman et al. | 137/624.15 |
| 3,869,854 | 3/1975 | Church | 137/624.2 X |
| 4,015,366 | 4/1977 | Hall | 47/1 R |
| 4,023,020 | 5/1977 | Lestradet | 364/400 |
| 4,052,003 | 10/1977 | Steffen | 239/71 |
| 4,107,546 | 8/1978 | Sturman et al. | 307/141 |
| 4,119,367 | 10/1978 | Raynes et al. | 350/333 |
| 4,140,391 | 2/1979 | Laciak et al. | 364/569 X |
| 4,165,532 | 8/1979 | Kendall et al. | 364/420 |
| 4,171,539 | 10/1979 | Tawfik et al. | 364/900 |
| 4,176,395 | 11/1979 | Evelyn-Verre et al. | 364/420 |
| 4,189,776 | 2/1980 | Kendall | 364/420 |
| 4,190,884 | 2/1980 | Medina | 364/145 |
| 4,203,153 | 5/1980 | Boyd | 364/200 |
| 4,316,247 | 2/1982 | Iwamoto | 364/707 X |

*Primary Examiner*—Joseph F. Ruggiero
*Attorney, Agent, or Firm*—Dowrey & Cross

[57] ABSTRACT

An irrigation control system is provided which includes circuitry for minimizing electrical power consumption to permit battery-powered operation. The system also includes a microcomputer which is in a quiescent mode except when actuated by a rising edge of a clock signal which has been processed by two type C flip-flops. The microcomputer is programmed to drive a display and to control a valve which includes a bi-stable solenoid for controlling an irrigation cycle.

11 Claims, 14 Drawing Figures

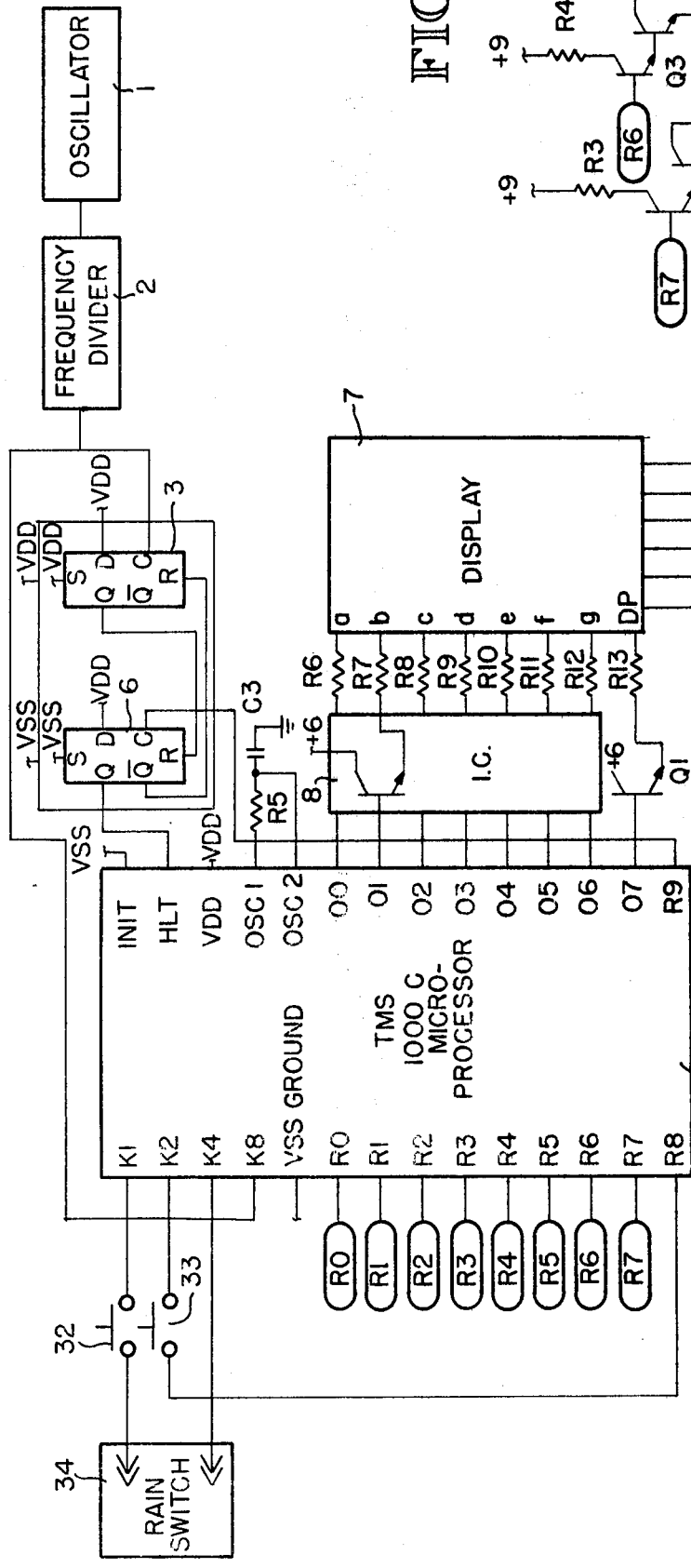
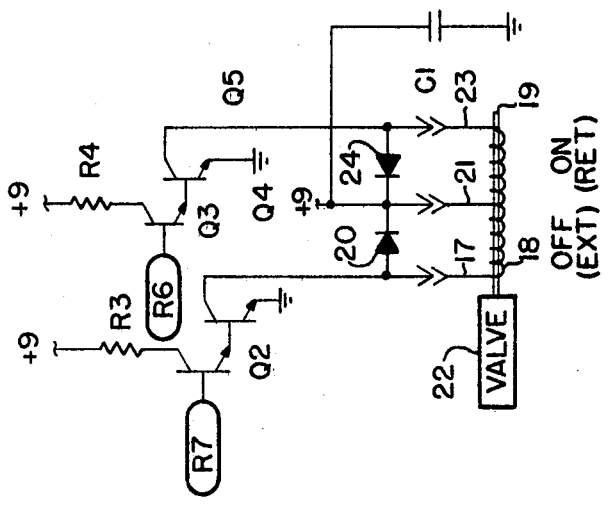
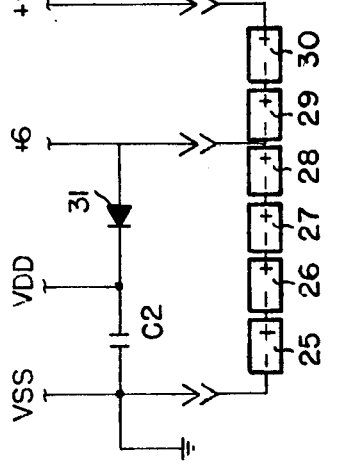
FIG. 1
FIG. 2
FIG. 3

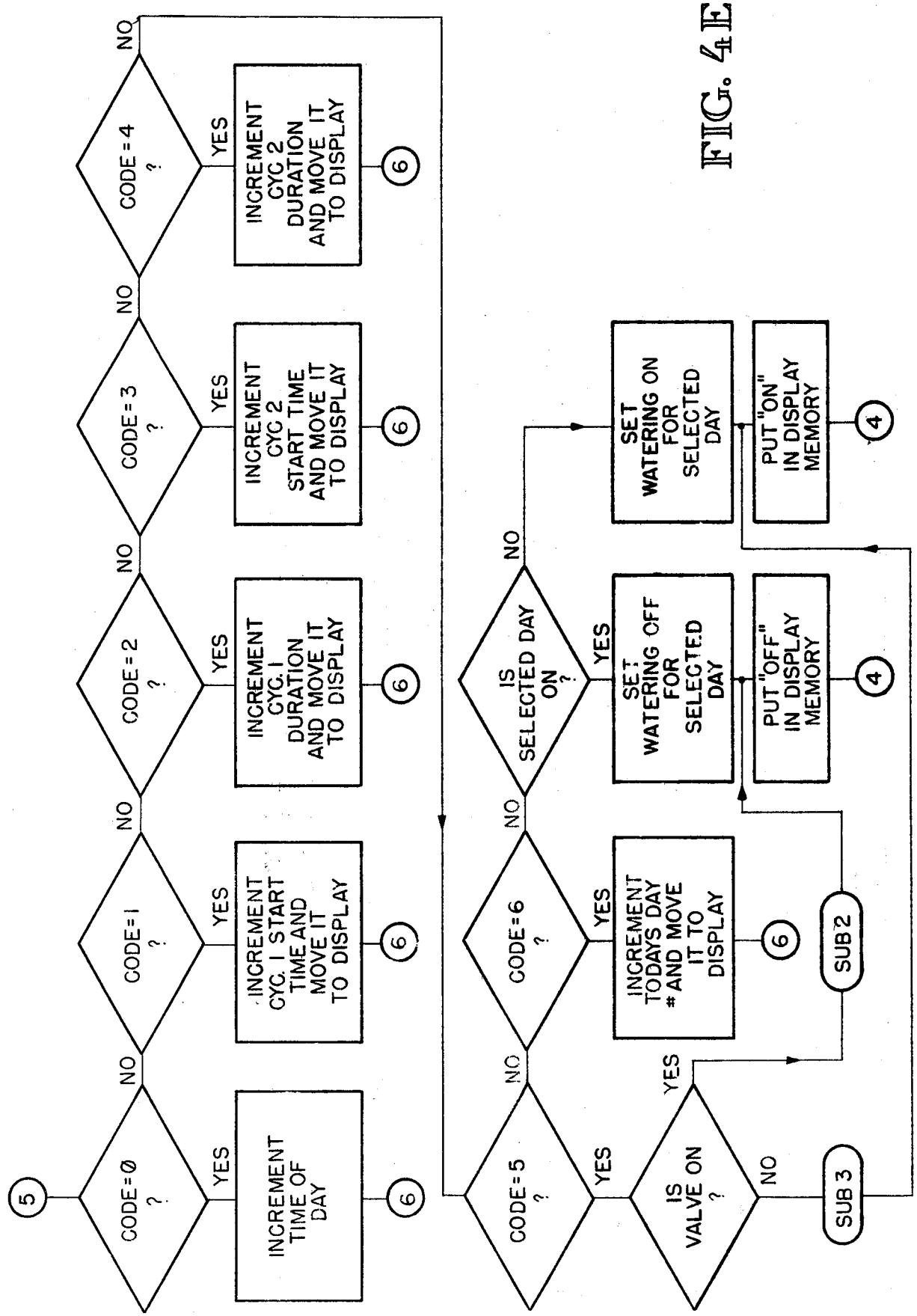

IRRIGATION CONTROL SYSTEM

BACKGROUND OF THE INVENTION

1. Field of the Invention

The present invention relates generally to irrigation control systems and particularly to battery-powered irrigation control systems which are programmable to control an irrigation cycle.

2. Description of the Prior Art

Several irrigation control systems for providing programmable automated control of an irrigation cycle are known in the art. However, prior art irrigation control systems require relatively large inputs of electrical energy and are, therefore, unusable where a convenient external source of electrical power is unavailable. Prior art irrigation control systems are also unnecessarily complicated and expensive for use by the average homeowner.

The time and expense involved in effective lawn watering are major considerations of many homeowners. There are many conditions under which it is desirable to have a programmable, automatically controlled irrigation or sprinkling system where it is impractical to have an external source of electrical power, such as a power line. Therefore there is a need in the art for an inexpensive, battery operable irrigation control system.

SUMMARY OF THE INVENTION

The present invention overcomes the disadvantages of prior art irrigation control systems by providing an irrigation control system, including computing means, which uses electrical power only upon the receipt of an actuating signal from an oscillator while performing functions according to a logic sequence programmed into the computing means for controlling the irrigation cycle. The computing means has outputs connected to a display and to a valve control circuit, which includes a bistable solenoid. The display uses electrical energy only when an operator puts signals into the system for setting the variables of the irrigation sequence; and the valve control circuit uses electrical energy only for a time sufficient to move the core of the bistable solenoid between an ON position and an OFF position. After actuating the solenoid at the pre-set times and performing other functions, the computing means outputs a STOP signal, which is processed by a flip-flop to turn off the computing means. Therefore the present invention uses very little electrical power and is suitable for battery-powered operation.

BRIEF DESCRIPTION OF THE DRAWINGS

FIG. 1 is a block diagram of an irrigation control system according to the invention;

FIG. 2 is a circuit diagram of a solenoid actuator controlled by the system of FIG. 1;

FIG. 3 is a circuit diagram of a power supply for the invention;

DESCRIPTION OF THE PREFERRED EMBODIMENT

Figure 4A:
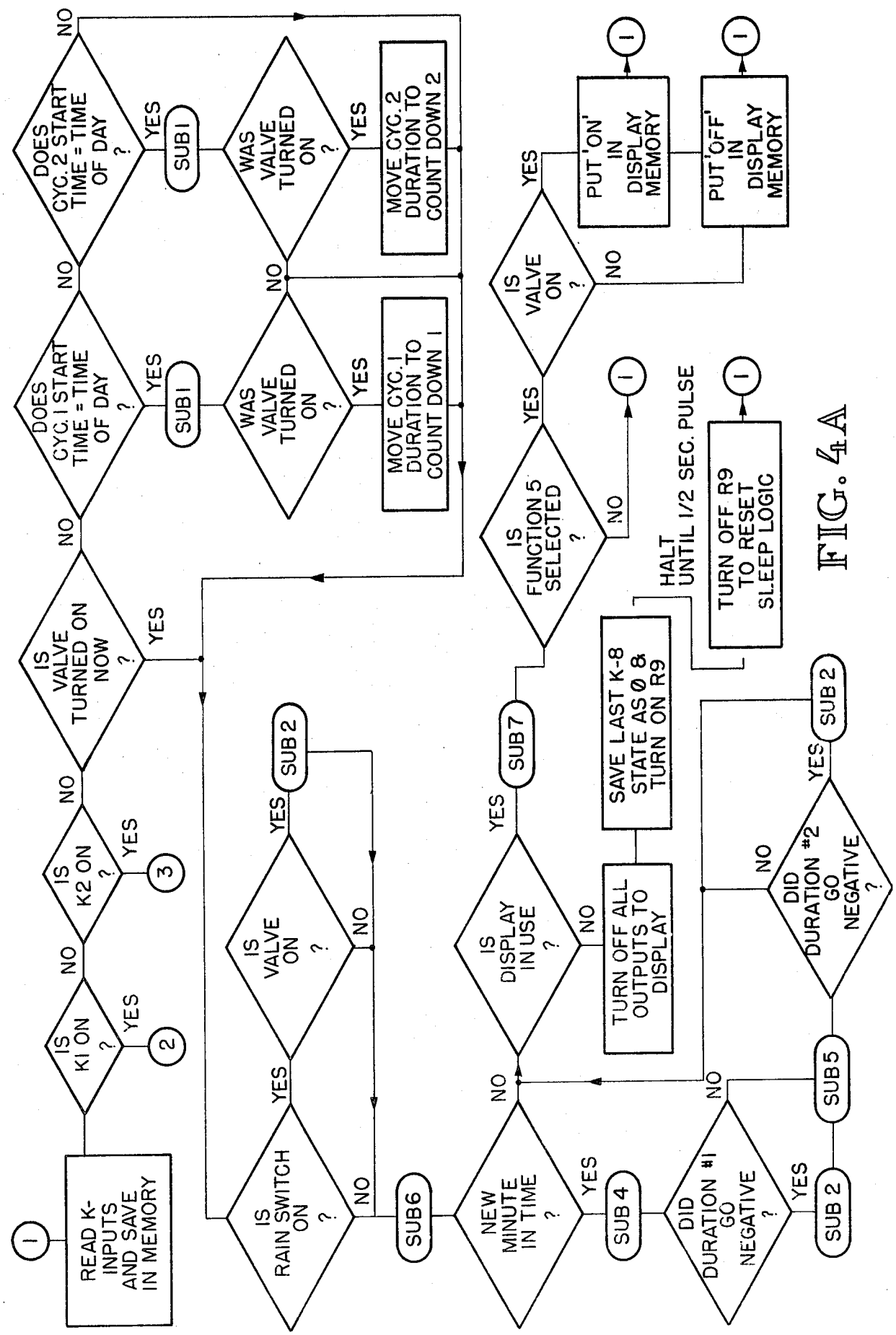
FIGS. 4A-4K depict the logic sequence incorporated into the control circuitry of the present invention.
Figure 4B:
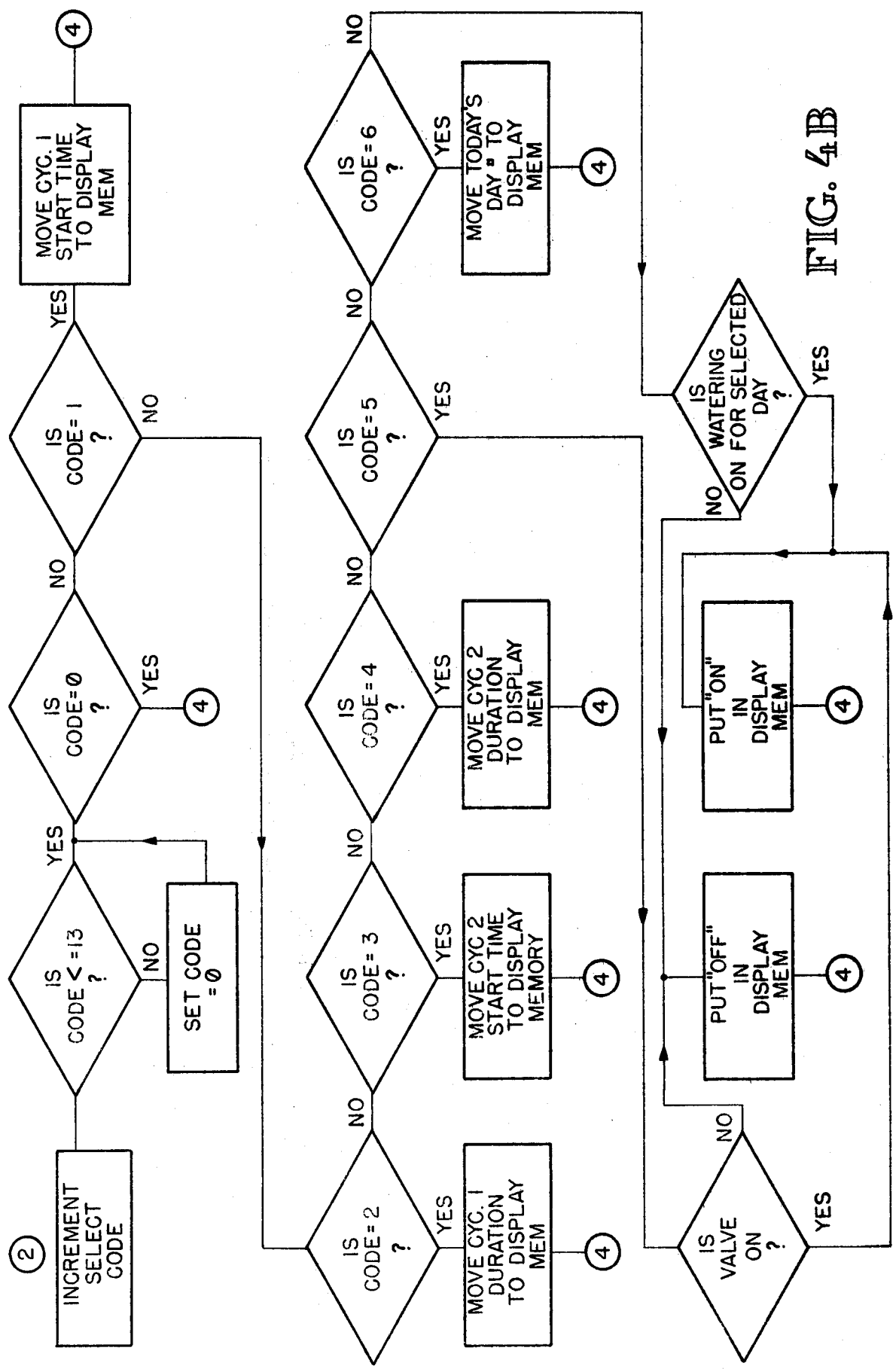
Figures 4C, 4D:
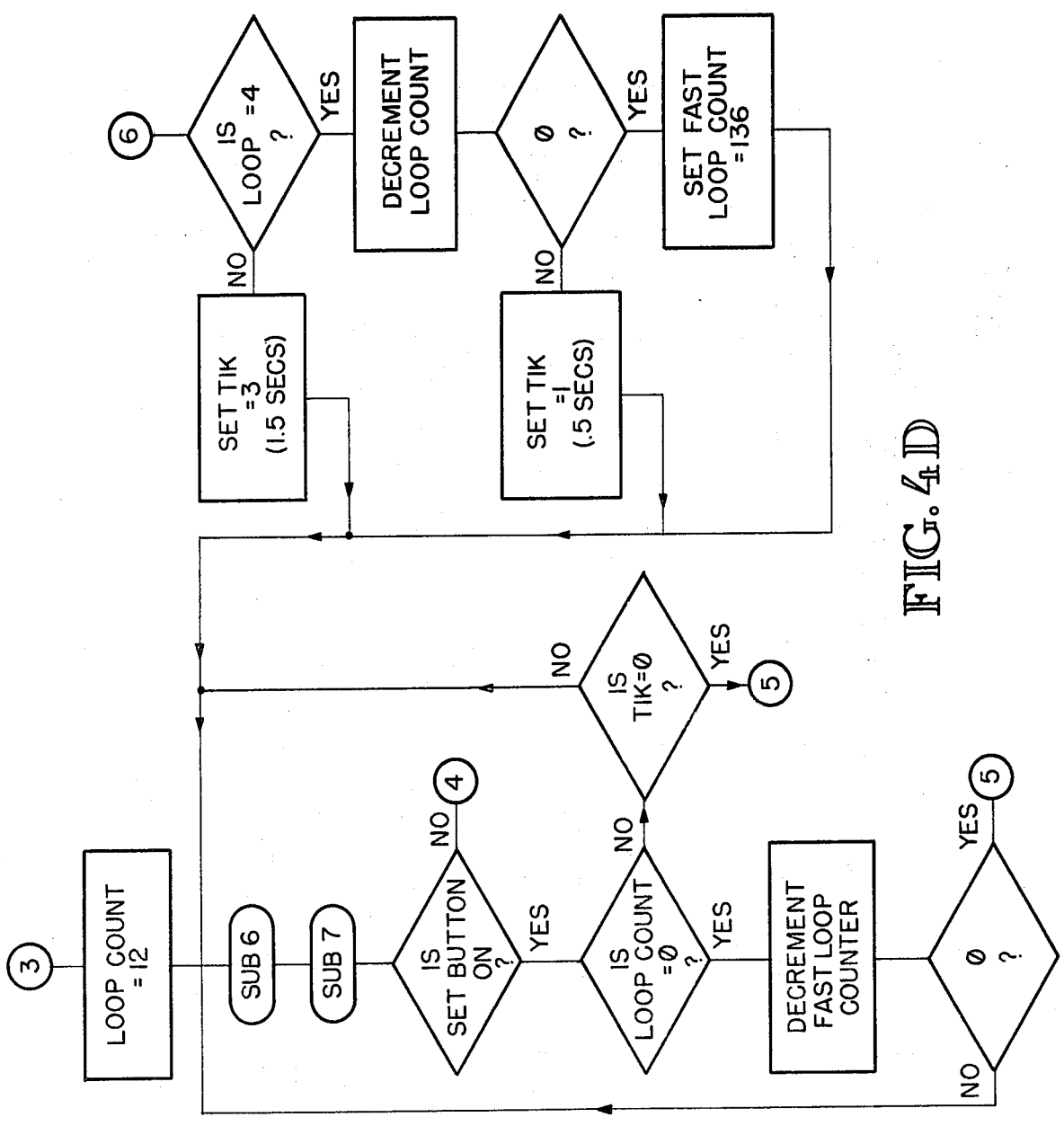
Figure 4G:
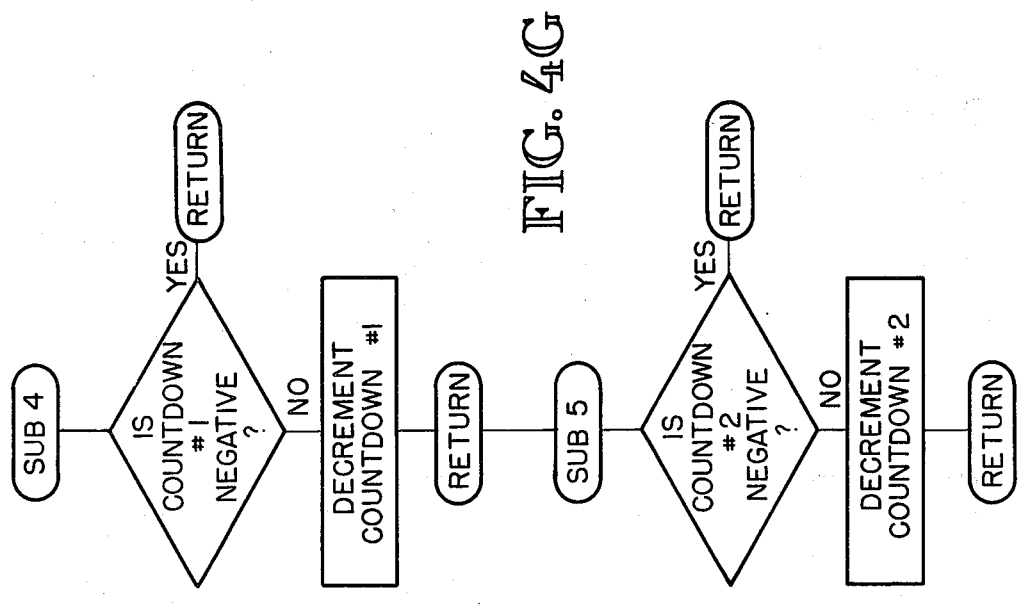
Figure 4F:
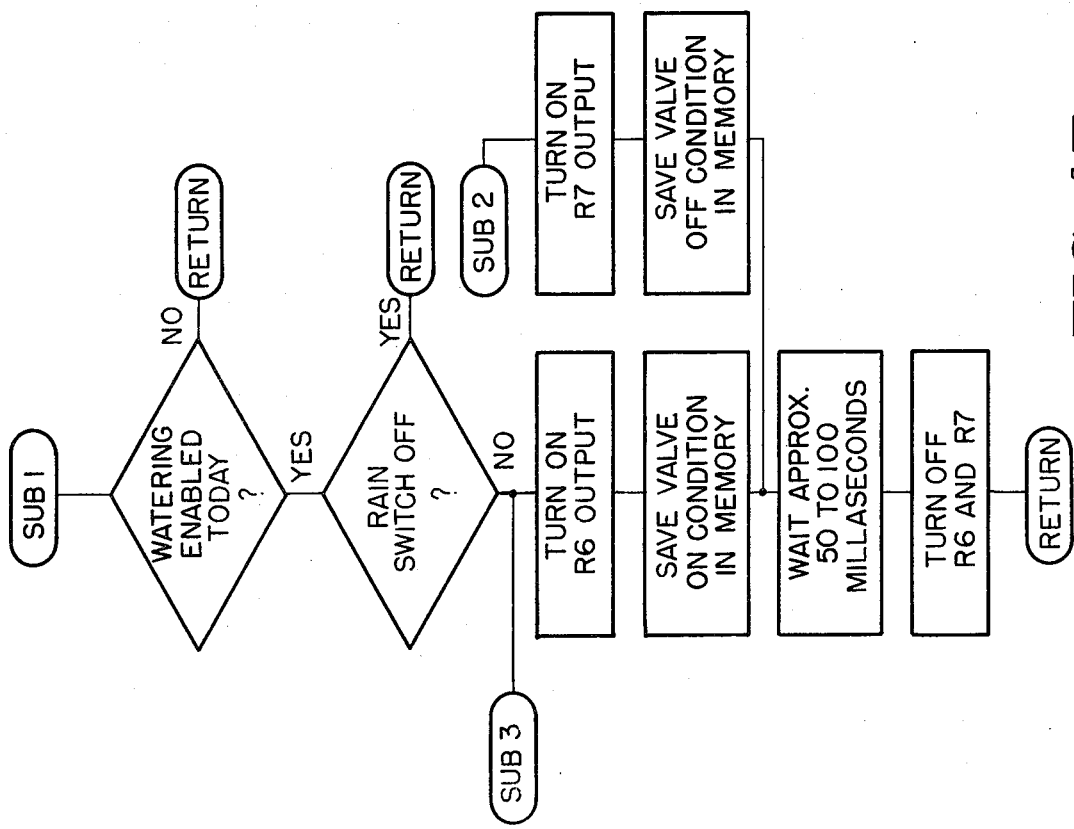
Figure 4H:
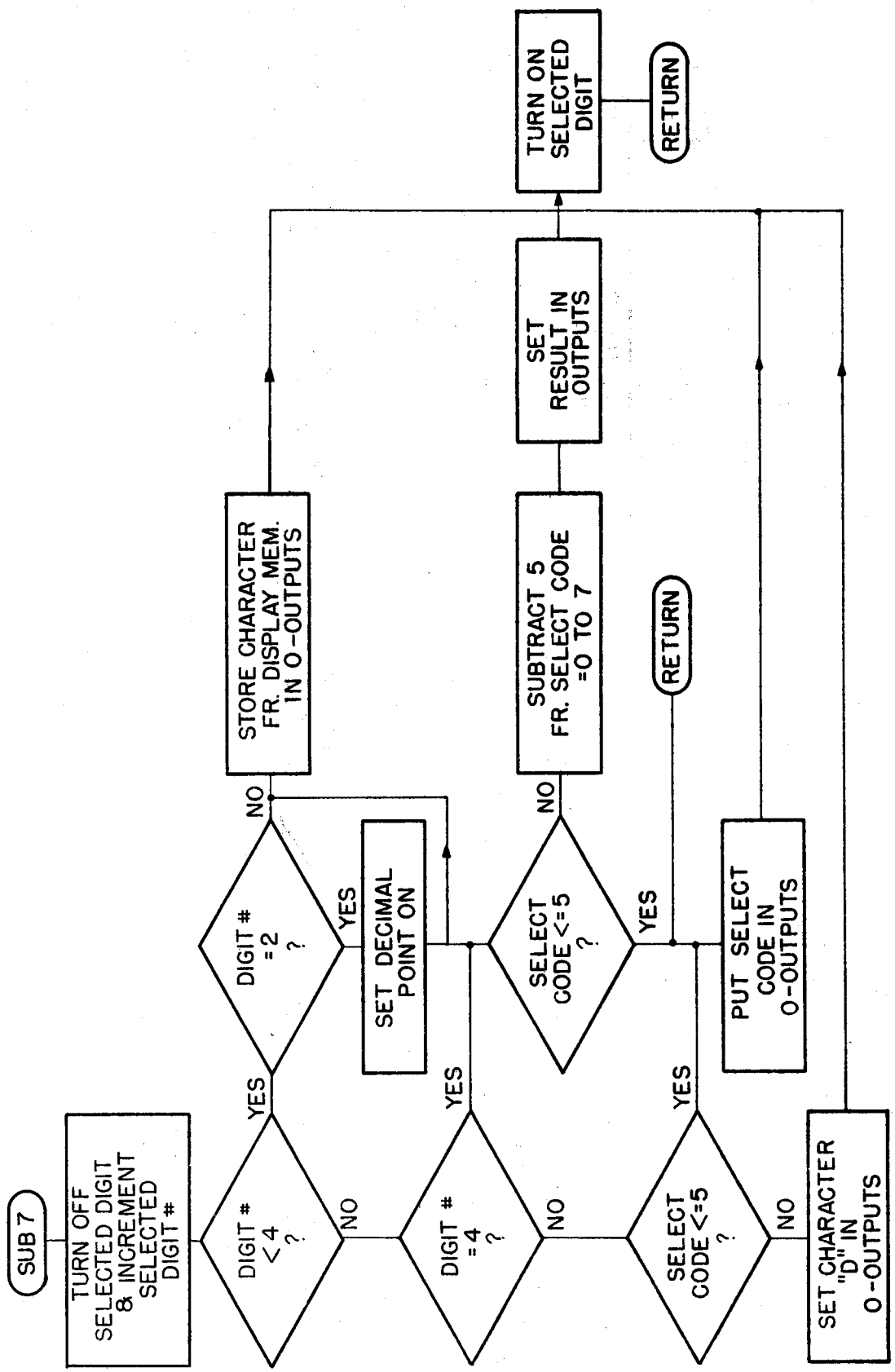
Figure 4:
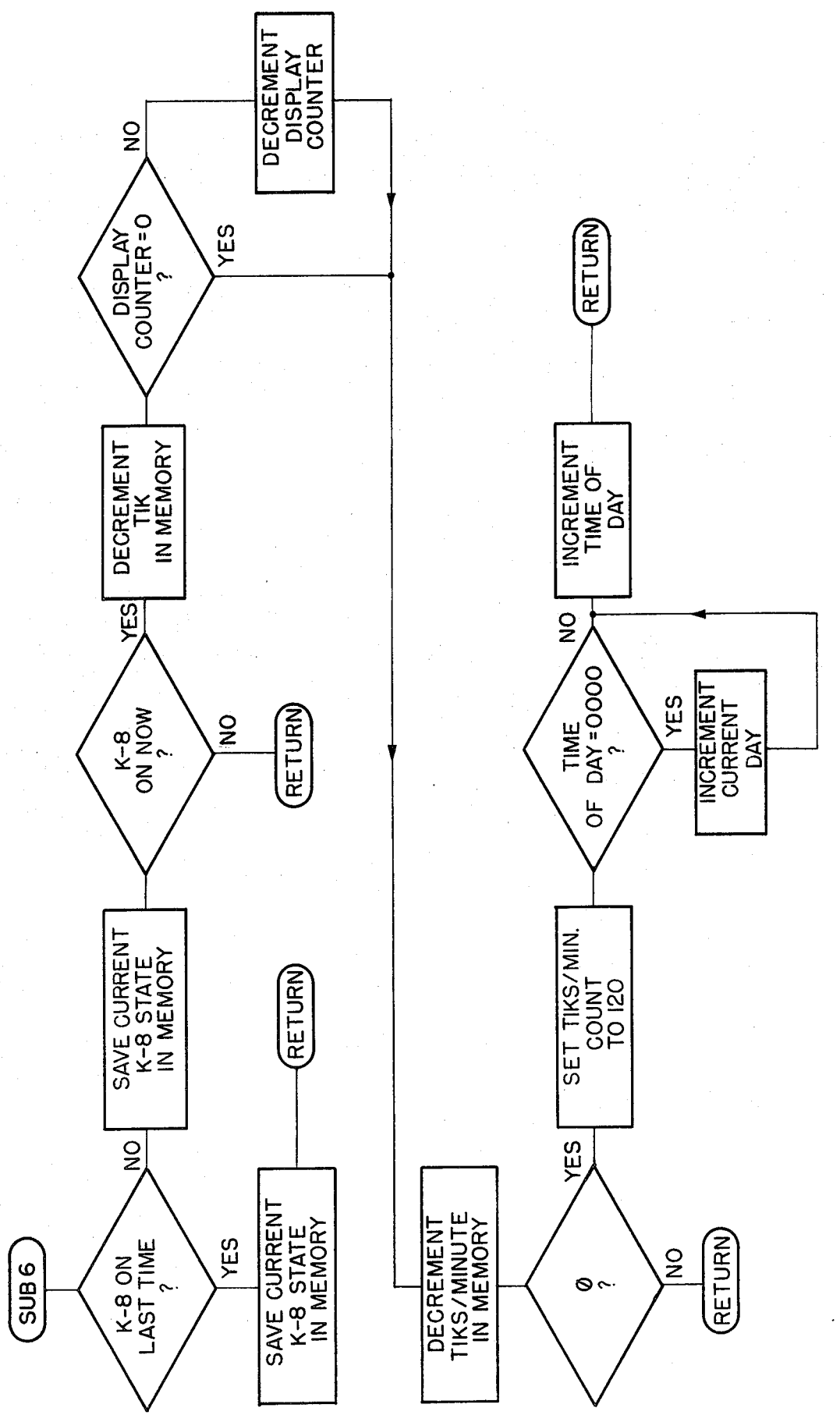
Figure 4J:
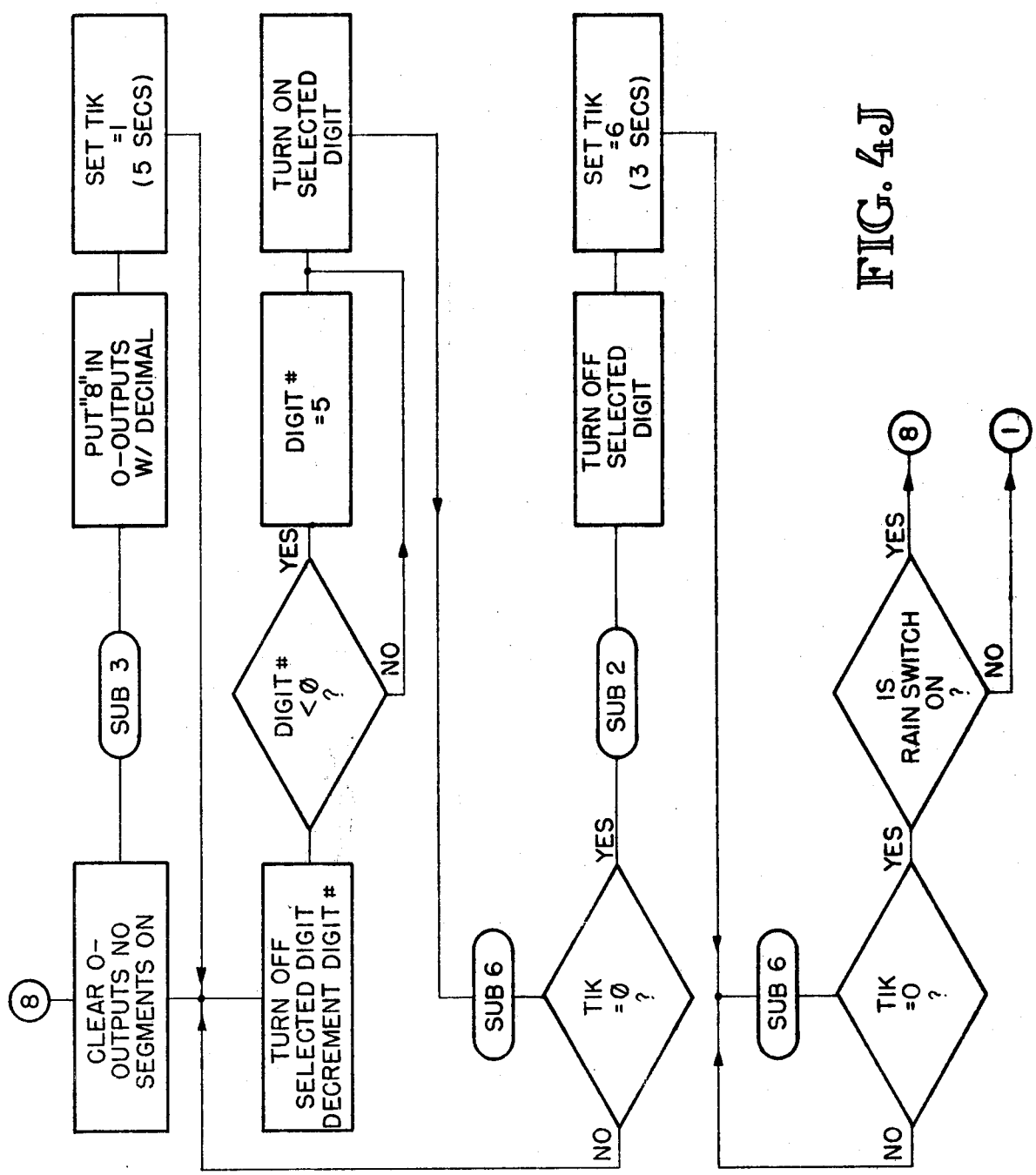

Referring to FIG. 1, an oscillator 1 supplies a square wave signal having a frequency of 32.768 KHz to a frequency divider 2 which divides the input frequency by $2^{14}$ to produce a 2 Hz clock signal which is input to the clock terminal of a type D flip-flop 3 and to the K8 terminal, which is the clock input of a computing means, such as a microcomputer 4. The microcomputer 4 is programmed such that the signal input to the K8 terminal causes the microcomputer 4 to update; and every 120 cycles of the 2 Hz input frequency causes the program to add one minute to the time elapsed since the last setting of the irrigation cycle and to store the time of day in the memory thereof.

The D input of the flip-flop 3 is kept at a logic high by connection to a suitable 5 volt DC power source (not shown in FIG. 1). On the rising edge of a pulse input to the C terminal, the flip-flop 3 transfers the logic high of the D input thereof to the Q output. The Q output of the first flip-flop 3 is connected to the reset-direct input R of a second type D flip-flop 6; and the application of a logic high thereto resets the flip-flop 6, causing the output at the Q output terminal of the flip-flop 6 to be a logic low. The $\overline{Q}$ output terminal of the flip-flop 6, which is a logic high when the Q output is a logic low, is connected to the reset-direct input R of the flip-flop 3 to reset the Q output thereof to a logic low to await retriggering by the next rising edge of the 2 Hz signal. When both flip-flops 3 and 6 are cleared, the Q output terminal of the flip-flop 6 applies a logic low to a halt terminal HLT of the microcomputer 4. Application of a logic low to the halt terminal HLT energizes the microcomputer 4, causing it to turn on from its normally off condition. Therefore the halt terminal HLT provides means for regulating consumption of electrical power by the microcomputer 4. In the off, or quiescent condition, the microcomputer 4 consumes virtually no electrical power.

The microcomputer 4 has a plurality of inputs K1, K2, K4 and K8 for admitting control signal inputs for purposes such as setting the time and duration of the irrigation cycle. After the microcomputer 4 turns on, the program updates the time and goes through the logic sequence of FIGS. 4A-4K, which requires about 1 millisecond if none of the inputs to the microcomputer 4 have received signals indicating readjustment of the irrigation cycle. After completing the logic sequence, the microcomputer 4 outputs a stop pulse at a stop output terminal R9, which is connected to the C input of the flip-flop 6. The D input of the flip-flop 6 is connected to a suitable DC power supply, not shown in FIG. 1, and is therefore at a logic high; and, therefore, the rising edge of the pulse output at the stop output terminal R9 causes a logic high to appear at the Q output of the flip-flop 6 and, thence, at the halt terminal HLT of the microcomputer. Application of a logic high to the halt terminal HLT causes the microcomputer 4 to turn off; and the microcomputer 4 remains off until the flip-flops 3 and 6 process a rising edge of the 2 Hz signal to apply a logic low to the halt terminal HLT. The ability of the irrigation control system to regulate consumption of electrical power by the microcomputer 4 by turning the microcomputer 4 on and off permits battery-powered operation of the invention for a year or more without changing batteries.

The microcomputer 4 has eight "O" outputs $O_0$-$O_7$ and ten "R" outputs $R_0$-$R_9$. The "O" outputs are used to generate characters for display on a display module 7, which may comprise a plurality of seven segment displays, one of which is represented in the display module 7 by the line segments a-g. A seven-transistor integrated circuit 8 is connected between the outputs $O_0$–$O_6$ and the inputs a–g, respectively, of the display module 7 with the base of one of the transistors in the integrated circuit being connected to the $O_1$ output of the microcomputer 4 and the emitter being connected to the b input of the display module to provide driving power to the b segment of each seven segment display in the display module 7. The collector of each transistor in the integrated circuit 8 is connected to a suitable DC power source (not shown in FIG. 1); and the remaining bases and emitters are connected to the corresponding "O" outputs of the microcomputer 4 and to the corresponding inputs of the display module 7. A transistor Q1 has the base thereof connected to the $O_7$ output of the microcomputer 4 and the emitter connected to the display module 7 for driving a decimal point indicator DP. The decimal point indicator DP and the segments a–g comprise suitable visual display means, such as light emitting diodes. A resistive network, comprising resistances R6–R12, connected between the inputs a–g of the display module 7 and the corresponding emitters of the integrated circuit, limits the electrical current which may be input to drive the segments a–g of the display module 7. Similarly, a resistance R13 limits the current which may be input to drive the decimal point indicator DP.

The preferred embodiment of the invention includes six seven-segment displays which are used to display numerals and certain letters of the alphabet to facilitate setting the irrigation cycle. To display a number, such as 1234.56, it is not necessary to drive the decimal point and each numeral simultaneously. Therefore, in order to conserve electrical power, which is particularly desirable in battery-powered operations, the outputs $R_0$–$R_5$ of the microcomputer 4 multiplex the five seven-segment displays and the decimal point indicator DP such that only one may be driven at a given time. The multiplexing occurs at a rate sufficient that the human eye notices no flickering of the light emitting diodes. The outputs $R_0$–$R_5$ of the microcomputer 4 are interfaced with the digit select inputs of the display module 7 by any suitable means, such as inverters 11–16 which are connected between the outputs $R_0$–$R_5$, respectively, and the corresponding digit select inputs of the display module 7.

The microcomputer 4 is programmed according to the logic sequence depicted in FIGS. 4A–4K to control the time and duration of logic high outputs at the R6 and R7 terminals for controlling an irrigation system. Referring to FIG. 2 a valve control signal is output from the output terminal R7 of the microcomputer 4 and input to the base of a transistor Q2, which has the collector thereof connected to a suitable nine-volt power source (not shown in FIG. 2) through a suitable current-limiting resistance R3. The emitter of the transistor Q2 is connected to the base of a transistor Q3 in the Darlington configuration for ampliflying electrical current. The transistor Q2 is nonconducting in the absence of a logic high at the R7 output of the microcomputer 4 so that the transistor Q2 draws current from the nine-volt power source (not shown in FIG. 2) only upon receipt of the proper command signal from the microcomputer 4. The emitter of the transistor Q3 is grounded, and the collector thereof is connected to an OFF terminal 17 of a bi-stable solenoid 18, which has a core 19, and to the anode of a diode 20, which has the cathode thereof connected to a center terminal 21 of the solenoid 18. The signal from the R7 output of the microcomputer 4 causes the core 19 of the bi-stable solenoid 18 to extend, which corresponds to the OFF position of a valve 22 for regulating the flow of water or other fluid. The bi-stable solenoid 18 stays in a given position until a reset signal is applied thereto, therefore the microcomputer 4 supplies the output signal at the output R7 only for a time sufficient to actuate the bi-stable solenoid 18 to the OFF position.

The R6 output terminal of the microcomputer 4 is connected to the base of a transistor Q4 for supplying a valve control signal thereto. The collector of the transistor Q4 is connected to a suitable nine-volt power source (not shown in FIG. 2) through a suitable current-limiting resistence R4. The emitter of the transistor Q4 is connected to the base of a transistor Q5 in a Darlington configuration similar to Q2 and Q3. When the microcomputer 4 outputs a logic high at the R6 terminal thereof, that logic high turns on the transistor Q4; and the transistor Q5 then amplifies the current input to the base thereof to cause the collector, which is connected to an ON terminal 23 of the bi-stable solenoid 18 and to the anode of a diode 24, to reset the bi-stable solenoid 18 to the retracted position, which corresponds to the ON position of the valve. After the bi-stable solenoid 18 is in the ON position, the output at the terminal R6 returns to zero because the bi-stable solenoid 18 remains in the ON position until receiving a signal from the output terminal R7. After a predetermined watering time interval, the microcomputer 4 outputs a high at the output terminal R7 to move the bi-stable solenoid 18 to the OFF position. The capacitor C1 is charged to about nine volts to supply approximately 1.5 amps to the bi-stable solenoid 18.

Referring to FIG. 3, a suitable power source for the circuitry of FIGS. 1 and 2 includes six 1.5 volt batteries 25–30 connected in series, a $V_{ss}$ terminal, a $V_{DD}$ terminal and a nine-volt terminal. The nine-volt power source for the transistors Q1 and Q2 comprises all six of the batteries 25–30; and the five-volt $V_{DD}$ source for the flip-flops and the microcomputer 4 is derived from the batteries 25–28. A diode 31 connected between the $V_{DD}$ terminal and the positive terminal of the battery 28 has an approximate voltage drop of one volt to provide the desired five volts at the $V_{DD}$ terminal. The capacitor C2 is charged to about five volts through the diode 31 which substantially prevents the capacitor C2 from discharging for about ten minutes to allow the batteries to be changed without resetting the time in the clock function of the microcomputer 4. The capacitor C2 also holds the voltages up on the electronic components of FIGS. 1 and 2 so that voltage drops caused by operation of the solenoid, which increase in magnitude as the batteries age, have no deleterious effect on the operation of the irrigation control system.

Variables of an irrigation cycle, such as time and duration, are controlled by inputs from a select switch 32 and a set swtich 33. A rain switch 34 may be selectively actuated to temporarily disrupt the irrigation sequence.

FIGS. 4A–4K depict a logic sequence for the invention. When the microcomputer 4 receives an actuating signal at the halt input terminal thereof, the microcomputer 4 reads the input terminals K1, K2, K4 and K8, which may have signals input thereto for setting the time of day, the time and duration for one or more watering cycles, the day of the week, and updating the time and selective interruption of the watering cycles. After reading the input terminals, the microcomputer 4 performs the logic sequence to accomplish the irrigation cycle entered therein. The logic sequence indicated by FIGS. 4A–4K is self-explanatory and includes information sufficient to enable one skilled in the art to program a microcomputer to perform the functions of the present invention described hereinabove.

Figure 5:
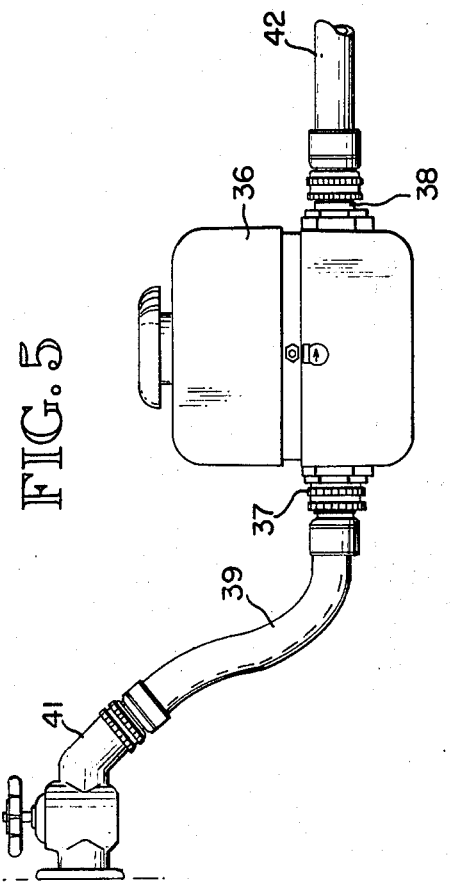
FIG. 5 illustrates the invention connected between a source of water and an output hose.
Figure 4K:
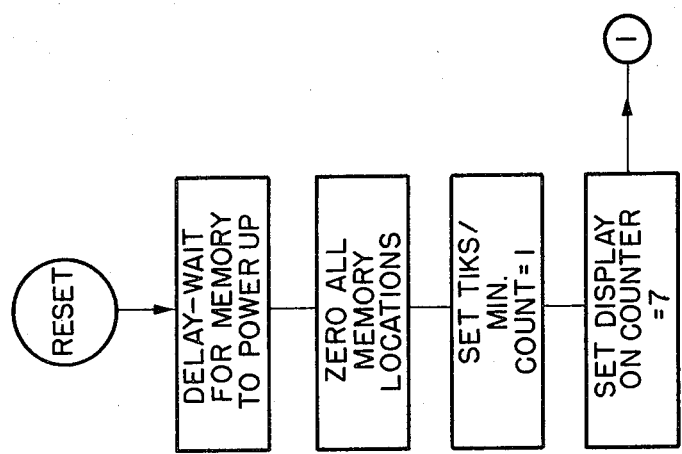

FIG. 5 illustrates the invention in an operational environment wherein the hereinabove-described circuitry and the valve 22 are enclosed in a case 36, which has an input hose fitting 37 and an output hose fitting 38 connected thereto. The input hose fitting 37 is connected to an input hose 39, which receives irrigation water from a faucet 41, which should be placed in the open condition. The output hose fitting 38 is connected to an output hose 42, which provides water to a sprinkler system (not shown).

Although the present invention has been described with reference to a specific preferred embodiment, it will be understood by those skilled in the art that modifications may be made without departing from the scope of the invention as defined by the appended claims.

What is claimed is:

1. An irrigation control system comprising:
   clock means for producing a clock output signal at predetermined time intervals;
   resettable switch means connected to said clock means for producing an actuating signal in response to said clock output signal;
   computing means for processing an input signal and producing an output signal for controlling an irrigation cycle, said computing means having a halt input connected to said switch means for receiving said actuating signal therefrom to actuate said computing means from a powered quiescent condition to perform a predetermined logic sequence, said switch means including a first type D flip-flop having a clock terminal connected to said clock means to receive said clock output signal therefrom and a second D flip-flop having a reset terminal connected to a Q output of said first flip-flop, the Q output of said second flip-flop being connected to said halt input, whereby said clock output signal results in application of an actuating signal to said input for actuating said computing means; and
   valve means connected to said computing means and controlled thereby for regulating fluid flow for said irrigation cycle.

2. An irrigation control system according to claim 1 wherein said valve means includes actuator means capable of being actuated between first and second positions to open and close said valve, said actuator means being selectively operable between said positions by application of valve control signals for said computing means to said actuator means.

3. An irrigation control system comprising:
   clock means for producing a clock output signal at predetermined time intervals;
   resettable switch means connected to said clock means for producing an actuating signal in response to said clock output signal;
   computing means for processing an input signal and producing an output signal for controlling an irrigation cycle, said computing means having a halt input connected to said switch means for receiving said actuating signal therefrom to actuate said computing means from a powered quiescent condition to perform a predetermined logic sequence;
   valve means connected to said computing means and controlled thereby for regulating fluid flow for said irrigation cycle, said valve means including actuator means capable of being actuated between first and second positions to open and close said valve, said actuator means being selectively operable between said positions by application of valve control signals from said computing means to said actuator means said actuator means further including a bistable solenoid which includes an ON input and OFF input and a center input;
   means for supplying electrical energy to said irrigation control system;
   a first transistor having the base thereof connected to said computing means for receiving a first valve control signal therefrom, said first transistor having the collector thereof connected to said means for supplying electrical energy, said first transistor being nonconductive in the absence of said first valve control signal;
   a second transistor having the base thereof connected to the emitter of said first transistor and having the collector thereof connected to said OFF input for supplying a signal thereto for placing said bistable solenoid in said OFF position;
   a third transistor having the base thereof connected to said computing means for receiving a second valve control signal therefrom, said third transistor having the collector thereof connected to said means for supplying electrical energy, said third transistor being nonconductive in the absence of said second valve control signal; and
   a fourth transistor having the base thereof connected to the emitter of the third transistor and having the collector thereof connected to said ON input for supplying a signal thereto for placing said bistable solenoid in said ON position.

4. An irrigation control system according to claim 3, further including:
   a first diode having the anode thereof connected to the collector of said second transistor and having the cathode thereof connected to said center input of said bistable solenoid;
   a second diode having the anode thereof connected to the collector of said fourth transistor and having the cathode thereof connected to said center input of said bistable solenoid; and
   a capacitor connected to said center input of said bistable solenoid for supplying electrical current thereto to move said solenoid between said ON position and said OFF position.

5. An irrigation control system according to claim 4 wherein said means for supplying electrical energy includes:
   a battery;
   a third diode having the anode thereof connected to a positive terminal of said battery; and
   a capacitor connected between the cathode of said third diode and the negative terminal of said battery for receiving an electrical charge from said battery, said third diode maintaining said electrical charge on said capacitor, the outputs of said means for supplying electrical energy being taken from said capacitor for permitting temporary disconnection of said battery without disconnecting electrical power from said computing means.

6. An irrigation control system according to claim 5 including input means for supplying input signals to said computing means for regulating the time and duration of said irrigation cycle.

7. An irrigation control system according to claim 6 further including a rain switch means for selectively interrupting said irrigation cycle.

8. An irrigation control system according to claim 1 wherein said computing means includes a stop output terminal, said stop output terminal being connected to the clock input of said second flip-flop, said computing means providing a stop signal at said stop output after completing a logic sequence programmed thereinto for controlling said irrigation cycle whereby said second flip-flop provides a halt signal to said halt input of said computing means for turning off said computing means until the application of an actuating signal from said clock means.

9. An irrigation control system comprising:
  computing means for processing an input signal and producing an output signal for controlling an irrigation cycle;
  means for supplying electrical power to said computing means;
  valve means connected to said computing means and controlled thereby for regulating fluid flow for said irrigation cycle; and
  means for selectively actuating said computing means to reduce consumption of electrical power thereby, said means including an oscillator for providing a clock signal having a predetermined frequency, a first type D flip-flop having a clock input terminal connected to said oscillator to receive said clock signal therefrom, and a second type D flip-flop having a reset input terminal connected to a Q output of said first flip-flop, the Q output of said second flip-flop being connected to said computing means for supplying an actuating signal thereto for causing said computing means to perform a predetermined logic sequence for controlling said irrigation cycle.

10. An irrigation control system according to claim 9 wherein said computing means has a stop terminal connected to a clock input terminal of said second flip-flop, said computing means being programmed to produce a stop signal upon completion of said logic sequence, whereby said second flip-flop processes said stop signal and outputs a halt signal to said computing means for placing said computing means in a quiescent condition wherein said computing means consumes virtually no electrical power.

11. An irrigation control system according to claim 9 wherein said valve means includes:
  valve actuating circuit means, connected to said computing means for receiving a valve control signal therefrom, for actuating a valve, said valve actuating circuit means being configured to consume electrical power only while receiving said valve control signal from said computing means, said valve means including actuator means connected to said valve actuating circuit means, said actuator means being selectively movable between an ON position and an OFF position for regulating fluid flow through said valve means.

* * * * *